Oct. 15, 1940.  A. H. GAEBEL  2,218,165
APPARATUS FOR PREPARING PHOTOENGRAVING PLATES
Filed Sept. 29, 1936   3 Sheets-Sheet 1
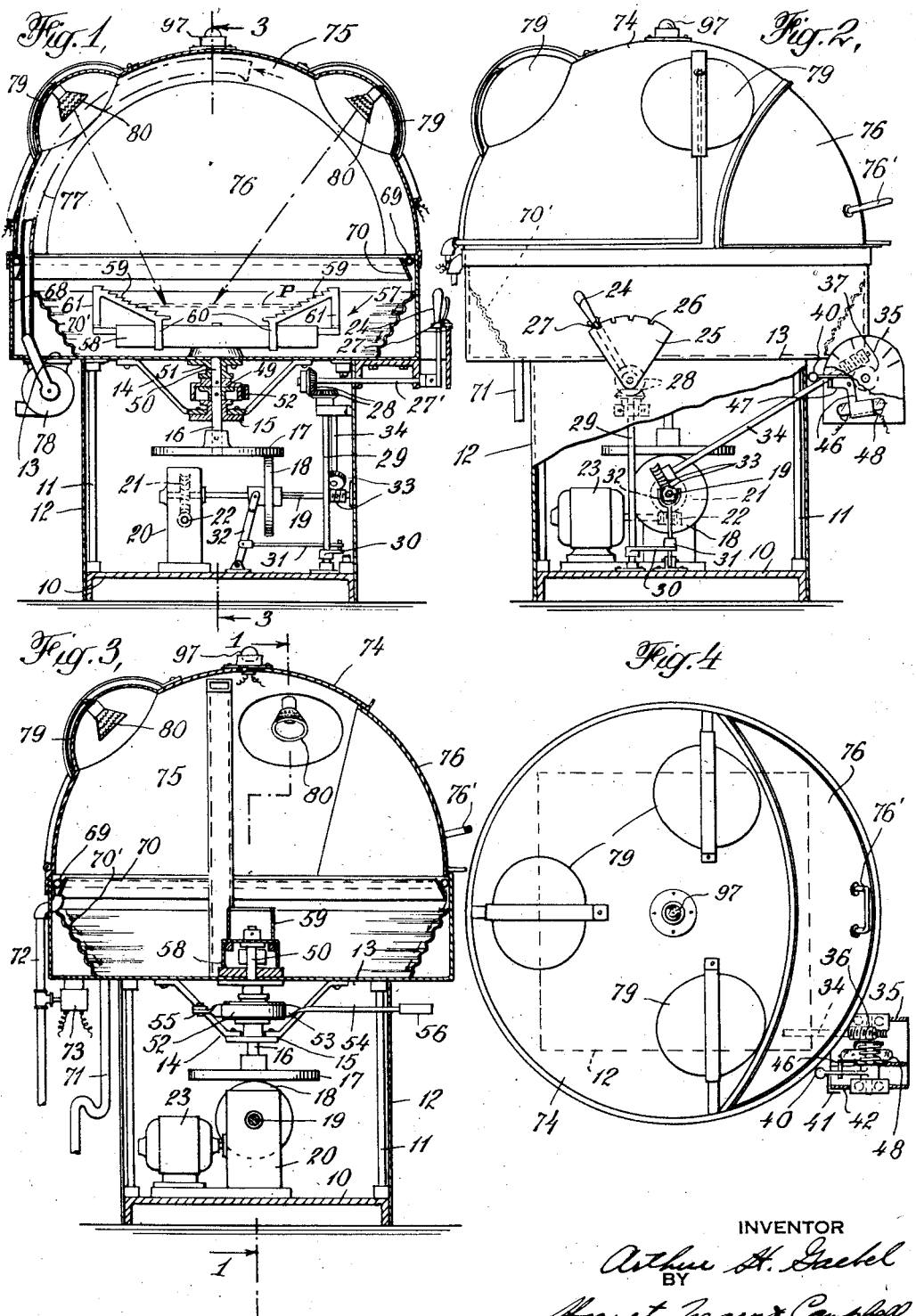
INVENTOR
Arthur H. Gaebel
BY
Hoguet, ———— Campbell
ATTORNEYS

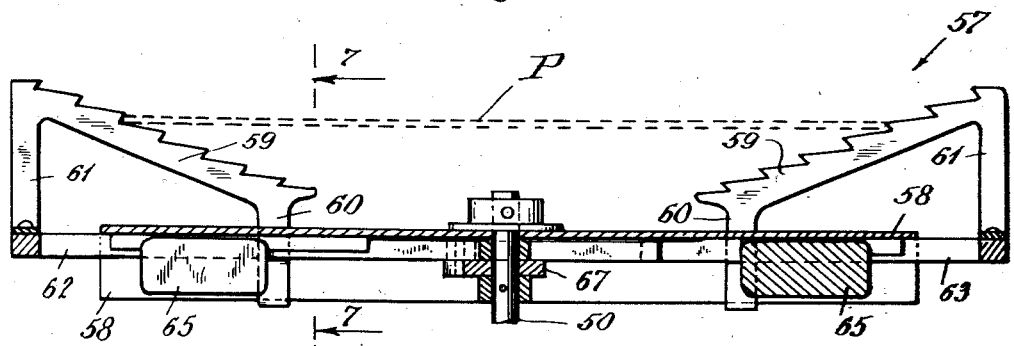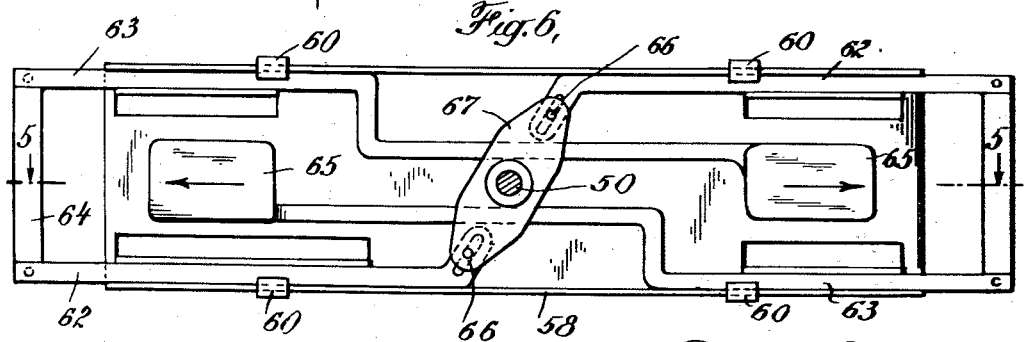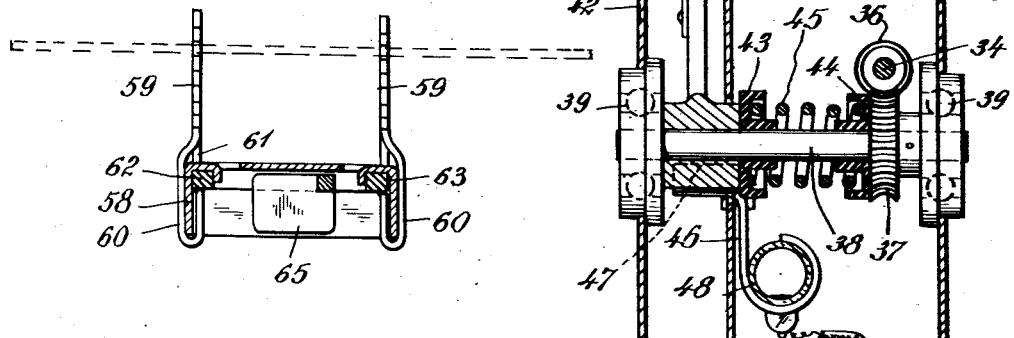

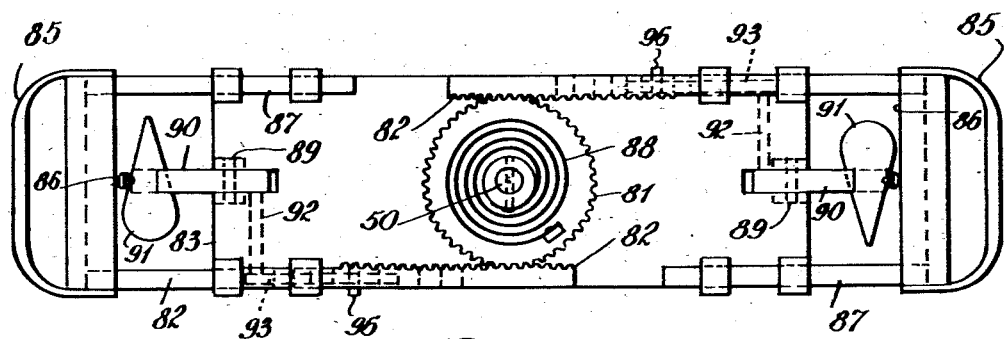
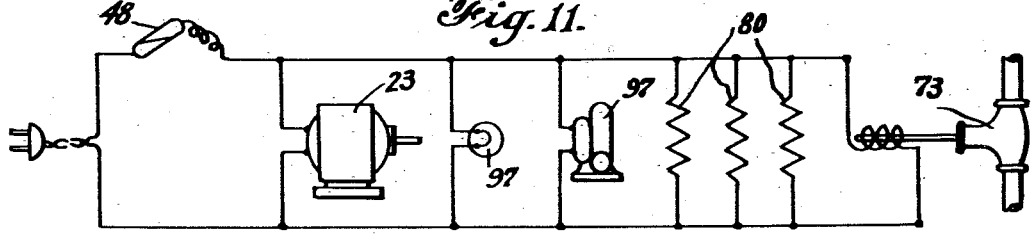
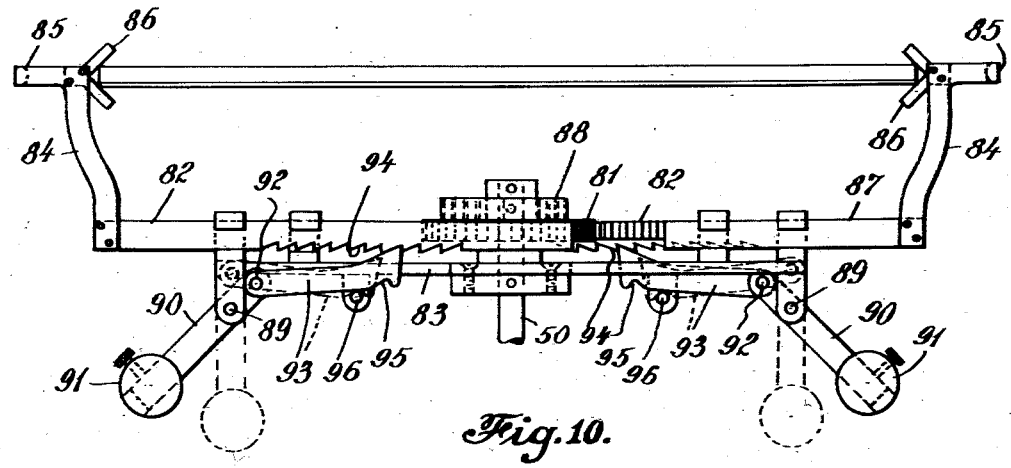

Patented Oct. 15, 1940

2,218,165

UNITED STATES PATENT OFFICE 2,218,165

APPARATUS FOR PREPARING PHOTOENGRAVING PLATES

Arthur H. Gaebel, Larchmont, N. Y.

Application September 29, 1936, Serial No. 103,221

10 Claims. (Cl. 34—32)

This invention relates to apparatus for preparing photoengraving or photolithographic plates, and has particular reference to a machine for automatically distributing and hardening the initially plastic sensitizing enamel coating on the plate by combined centrifugal force and heat. Such machines are commonly known in the art as "whirlers."

The whirlers in current use are usually heated by the direct heat of gas flames, the fumes of which frequently chemically affect the sensitized surface of the plate so that an inferior plate is produced, and this is especially the case when dichromate of ammonia is employed as the light-sensitive medium. Also, inasmuch as these machines are left open to allow escape of the gas fumes the plate must be removed promptly after the surface has hardened in order to prevent it from being light-struck, so that the machine requires close attention during use. Furthermore, in these current machines, the enamel frequently begins to harden before it has been evenly distributed by centrifuging, because of the direct heat applied to it, unless care is exercised in retarding the application of the heat until the plate has been whirled a sufficient time to distribute the enamel.

In accordance with the present invention, a whirler is provided which is fully automatic in operation and which evenly distributes the sensitizing coating in a hard, uniform-density layer over the plate, whereby uniform results are assured with all types of sensitizing enamel in general use for photoengraving or photolithographic purposes.

The whirler of this invention automatically centers the plate and rotates it at any one of a number of selected speeds for a predetermined period of time during which the plastic sensitizing coating is subjected to a concentrated radiant heat, which, however, does not become effective until after the plate has been whirled a sufficient time to evenly distribute the coating. The light emanating from the heat sources is not actinic so as to affect the light-sensitive material, and the heat is automatically turned off after a predetermined hardening time for the coating.

More particularly, the new whirler comprises a closed chamber forming a dark room within which rotates a self-adjusting holder, which is self-adapting to all sizes of plates and which is provided with centrifugally-actuated gripping means for securely holding the plate face up or face down. The radiant heat for hardening the coating is supplied by a number of spaced electric resistance heaters and is concentrated by parabolic reflectors to different areas of the rotating plate. These heaters are energized simultaneously with the beginning of rotation of the plate, but do not emit effective heat until the plate has been rotated a sufficient time to allow even distribution of the coating. The light emanating from such heaters contains no actinic rays, so that the sensitized coating is not light-struck.

A suction pump continuously withdraws air from the closed drying chamber so as to create a partial vacuum therein, thereby securing more rapid drying of the coating without affecting the sensitizing material as would be the case if greater heat were employed to effect more rapid drying. The enamel discharged against the side walls of the chamber is continuously flushed off by water. The water valve, suction pump and electric glow heaters are simultaneously turned off automatically by a preset timing device controlling the motor for rotating the plate holder. The plate may be left in the whirler for an indefinite time inasmuch as the drying chamber thereof is closed to outside light. Means are also provided for manually stopping the rotation of the plate holder without stopping the entire machine.

For a more complete understanding of the invention, reference may be had to the accompanying drawings, in which:

Figure 1 is a vertical section through the new whirler as seen along the line 1—1 of Fig. 3;

Fig. 2 is an elevation thereof, with a portion of the pedestal housing removed;

Fig. 3 is an axial section as seen along the line 3—3 of Fig. 1;

Fig. 4 is a plan view of the machine;

Fig. 5 is an enlarged longitudinal section through the plate holding mechanism as seen along the line 5—5 of Fig. 6;

Fig. 6 is a bottom view thereof;

Fig. 7 is a transverse section therethrough as seen along the line 7—7 of Fig. 5;

Fig. 8 is an enlarged section of the timing mechanism;

Figs. 9 and 10 illustrate respective plan and elevational views of a modified form of plate holder; and Fig. 11 is a diagrammatic showing of the electrical circuit of the whirler.

In these drawings, numeral 10 designates a base carrying a frame 11 which forms a pedestal for the machine and is enclosed by a sheet metal housing 12. A bed-plate 13 supported on the pedestal frame 11 carries the bracket 14 having the journal 15 for vertical drive shaft 16.

Pinned to the lower end of drive shaft 16 is a disc 17 engaged by a friction wheel 18 splined on shaft 19 suitably journaled at one end in the gear case 20 and at the other end on the housing 12. The end of the shaft within the gear case 20 is fitted with a worm wheel 21 driven by the worm 22 on the shaft of motor 23. When equivalent spur or bevel gearing is employed, the motor 23 acts as a dynamic brake for the rotating parts after the power is shut off.

Friction wheel 18 is shiftable radially on disc 17 along shaft 19 to vary the speed of shaft 16 at will, by moving handle 24 over segment 25, which is provided with notches 26 for engagement by latch 27 to set the disc 18 at predetermined points to secure commensurate speeds. The handle 24 is connected to shaft 27', in turn connected by bevel gears 28 to shaft 29 having a crank 30 at its lower end. Crank 30 is connected by link 31 to lever 32 pivoted at one end to the base 10 and connected at its free end to friction wheel 18. It will be seen that movement of handle 24 causes crank 30 to shift wheel 18 radially along disc 17.

The timing mechanism for predetermining the duration of operation of the machine up to three minutes, for example, is illustrated in enlarged detail in Fig. 8. This mechanism is operated from shaft 19 by a worm and wheel combination 33 driving shaft 34, which extends diagonally into casing 35 supported on the bed-plate 13. The end of shaft 34 carries worm 36 driving worm wheel 37 pinned on shaft 38 journaled in ball bearings 39 mounted on casing 35.

Journalled on shaft 38 is a handle 40 having a pointer 41 moving over a scale 42 graduated in minutes and seconds up to three minutes. This handle is frictionally coupled to the worm wheel 37 by a slip coupling including discs 43 and 44 respectively engaging the handle 40 and worm wheel 37 and urged frictionally against them by spring 45, so that handle 40 can be shifted manually relatively to the worm wheel 37, but is driven by the latter.

Pivoted on casing 35 is a lever 46 having a detent 47 located in the path of movement of the handle 40 and carrying the mercury contact switch 48, which is normally biased to closed position and controls motor 23 and other elements of the machine, as will be described. It will be seen that positioning of the handle in a clockwise direction, as seen in Fig. 2, relatively to worm wheel 37 determines the time it will take the worm wheel 37 to drive the handle 40 in a counter-clockwise direction to the extreme position where it will engage detent 47 to tilt switch 48 and thus open the motor 23 circuit. The scale 42 indicates this time.

The upper end of drive shaft 16 is fitted with one element of a friction coupling 49, the other element of which is connected to the lower end of drive shaft 50 aligned with drive shaft 16 and slidable axially in journal 51, so it rests on the lower element of coupling 49 and is frictionally driven thereby. The upper element of coupling 49 is provided with a downwardly depending flange forming a brake drum 52, which is adapted to be engaged by a brake shoe 53 carried by a lever 54 pivoted at one end 55 on the bracket 14 and having a handle 56 at its other end extending through a slot in the pedestal housing 12. When the brake 53 is applied to the brake drum 52, the friction coupling 49 slips and the rotation of driven shaft 50 is stopped or slowed, depending upon the degree of application of the brake.

Secured to the upper end of driven shaft 50 for rotation therewith is the plate holder 57. As shown especially in Figs. 5, 6 and 7, the holder 57 includes a channel-shaped frame 58, on the flanges of which are slidably mounted a pair of inclined stepped jaws 59. Jaws 59 each have opposite inner legs 60 turned upwardly over the lower edge of the corresponding side flanges of frame 58, and also opposite outer legs 61 secured to corresponding bars 62, which are slidable longitudinally in the frame 58, as illustrated in Fig. 7. The outer ends of the bars 62 and 63 are connected by a brace 64, so that the bars move together as a unit.

Each bar 63 carries a weight 65 which is located on the opposite side of shaft 50 from its jaw 59, i. e., the left hand weight 65 corresponding to the right hand jaw 59, and vice versa, as seen in Fig. 6. The inner end of each bar 62 is connected by a pin-and-slot combination 66 to the corresponding end of a double lever 67 journalled on shaft 50. It will be seen that as the shaft 50 rotates, each weight 65 is urged outwardly, due to centrifugal force, so as to draw the connected opposite jaw 59 toward the center. Inasmuch as both jaws 59 are connected together by the lever 67, the movement of one is communicated to the other and vice versa, so that they move as a unit. This coaction renders them effective to self-center the plate P placed between them, which is gripped more tightly as the speed of rotation increases. The steps on jaws accommodate all sizes of plates which may be placed thereon face upwardly or face downwardly, depending upon requirements.

Extending upwardly from the margin of bed-plate 13 to a point above the top of the plate holder 57 is a circular wall 68. A circular water spray pipe 69 is located adjacent the top edge of the wall 68 and discharges into the annular space formed by apron 70, which directs the water in a sheet over the inner surface of the cone 70' to flush it of enamel discharged by the rotating plate. The cone 70' is corrugated or ribbed horizontally to break up the jet effects of the holes in the pipe 69. The spent water collects on bed-plate 13 which is slightly recessed so that the water flows out through pipe 71 which is trapped to be relatively air-tight. The water is supplied to ring 69 by pipe 72, controlled by a solenoid valve 73 in the motor circuit. Thus, when motor 23 is operating, valve 73 is open and flushing water is supplied. When switch 48 breaks the motor circuit, solenoid valve 73 is closed.

A hemispherical-shaped dome or hood 74 mounted on the upper edge of wall 68 closes the chamber 75 to which access may be had by means of the door 76, which may be moved upwardly within hood 74 by handle 76' and fits substantially air-tightly when closed. A suction pipe 77, extending to the top of the hood 74 so as to draw the moist or vapor-laden air from the drying zone, is connected to a small motor-driven suction pump 78 secured to the bed-plate 13. The pump 78 is also connected in the circuit of the motor 23 and starts and stops according to the position of the switch 48. The pump 78 maintains a partial vacuum within hood 75, whereby drying and hardening of the enamel on the plate are facilitated, as well as abstraction of the moisture or vapor laden air.

Located at substantially equal spaced points on the dome or hood 74 are three parabolic reflectors 79, within each of which is located an electric resistance or glow heater 80, these heaters being in the circuit of motor 23 or otherwise controlled by switch 48. The reflectors 79 are so directed that the radiant heat emitted by the corresponding heaters 80 is concentrated on a different portion of the surface of plate P. Thus, one of them is directed on the center of the plate P and the others are directed at opposite ends of the plate P, for example. In this way each plate is uniformly heat-treated, regardless of its size, and no portion of its surface receives more heat than another.

In operation the late P, roughly coated with the wet or soft sensitizing material, whether of glue, albumen, shellac, or like base, is placed in the jaws 59, which may be spread apart manually to accommodate any size plate, although the steps therein adapt the jaws to any sized plate. The hood door 76 is then closed tightly and the machine started by throwing handle 40 to the proper selected timing position, as indicated on scale 42 by pointer 41. This action releases switch 48, which, being biased to closed position, closes the motor 23 circuit. At the time, glow heaters 80 are energized, suction pump 78 started, and solenoid valve 73 is opened to flush the cone 70' with water. As the machine gathers speed, weights 65 move outwardly, thus drawing jaws 59 together to clamp plate P tightly and center it as well.

It takes the glow heaters 80 approximately twenty seconds to heat, during which time the coating has been evenly spread over plate P by the centrifugal force of rotation. Accordingly, there is no heat-drying or hardening until after the coating is even and smooth on plate P. The concentrated radiant heat from heater 80 then drys the coating without affecting its light-sensitive properties in any way, since the light emitted by these heaters is not actinic. Meanwhile the pump 78 maintains a low vacuum within hood 75, whereby drying is facilitated and vapors and moisture removed. Also, handle 40 being gradually driven in a counter-clockwise direction, as seen in Fig. 2, until at the end of the time set on scale 42, handle 40 engages detent 47 and tilts switch 48 to open the circuit of motor 23, heaters 80, pump 78 and solenoid 73. As the hood 75 is closed against light, the plate may be left in the machine for an indefinite time without being light-struck.

As the machine is completely enclosed and silent in operation, it is difficult to determine from a distance when it is in operation, except by pointer 41, which, however, is not visible from all directions, and therefore a pilot light 97 in circuit with the motor 23 and heaters 80 is preferably located on top of the hood 74 as shown in Figs. 1 to 4.

An alternative form of plate holder is illustrated in Figs. 9 and 10, which is especially adapted for holding a plate P with its coated face down. Here a gear 81 is journaled on shaft 50 and engaging it are opposite racks 82 slidably mounted on a frame 83 pinned to shaft 50 so as to rotate therewith. Secured to the outer ends of the racks 82 are brackets 84 provided with handles 85, plate gripping jaws 86 and guide bars 87 opposite the racks 82 for aligning the latter in the frame 83. The jaws 86 are normally urged together by a spiral spring 88 secured at one end to the shaft 50 and at the other end to gear 81.

Pivoted intermediate their ends at 89 on the frame 83 are levers 90 having weights 91 at their outer ends, which are preferably streamlined in the direction of rotation to reduce air swirls within the casing. Secured to the inner ends of the levers 90 are cross pins 92 on which are pivoted pawl levers 93, adapted to cooperate with ratchet teeth 94 formed on the under side of racks 82. The under side of each pawl 93 is provided with a cam notch 95 cooperating with a pin 96 on the frame 83. The notches 95 are shaped in such a way that as the pawl 93 is projected inwardly, it rides up on pin 96 so that its end engages a ratchet tooth 94. Conversely, when pawl 93 is withdrawn, it drops downwardly to disengage teeth 94.

In use, the modified holder of Figs. 9 and 10 is opened manually by pulling outwardly on one of the handles 85 to open the jaws 86, which automatically close on the plate P because of the tension of spring 88. As the machine is started, rotation of the frame 83 results in the centrifugal swing of the weights 91 about pivots 89, causing pawls 93 to move up over pins 96 to engage a tooth 94. As rotation speed increases, weights 91 cause pawls 93 to urge jaws 86 into increasing clamping pressure with the plate P, which is preferably positioned face downwardly. As the rotation is stopped, weights 91 drop, disengaging pawls from teeth 94 so that they drop away from the racks due to notches 95, thus permitting manual retraction of the jaws 80.

It will be seen that a highly efficient and effective whirler is provided by this invention, which is automatic in operation and requires no attention beyond loading, unloading and time-setting. Although a preferred embodiment of the invention is described herein, it will be understood that the invention is not limited thereby but is susceptible of changes in form and detail within its scope.

I claim:

1. In apparatus for preparing photoengraving plates, the combination of means for holding the plate having an initially fluid emulsion thereon, an electric heater for the plate having the characteristics that it requires an appreciable time interval after energization to attain heat-emitting conditions, a motor for moving the plate-holding means to distribute the emulsion uniformly over the said plate, and a switch jointly controlling said motor and heater, whereby the motor moves the plate to distribute the emulsion uniformly over the said plate during the said time interval before the heat is applied to the plate.

2. In apparatus for preparing photoengraving plates, the combination of rotatable means for holding the plate, means for rotating said plate holding means, a hood substantially airtightly enclosing the means and plate, means responsive to operation of the said rotating means for heating the plate to dry the surface thereof, and means for withdrawing air from within the hood and creating a partial vacuum therein.

3. In an apparatus for preparing photoengraving plates, the combination of rotatable means for holding a plate, a dome-shaped hood enclosing said rotatable means and having an opening therein to permit a plate to be inserted into and removed from said rotatable means, a door having a curvature substantially complementary to a portion of said hood mounted for movement into positions to close and expose said opening, said hood and door being in light-tight relationship when said opening is closed, a plurality of radiant heating means mounted on said hood and reflectors for said heating means for directing the heat on different portions of the plate to heat the plate uniformly during rotation of said rotatable means.

4. In an apparatus for preparing photoengraving plates, the combination of rotary means for holding the plate, a dome-shaped hood enclosing said means and plate, a plurality of electric heaters mounted on said hood, a reflector for one of said heaters for directing the heat thereof upon substantially the center portion of the plate, and reflectors for the other heaters for directing the heat thereof on the marginal portions of said plate, whereby the plate is heated uniformly throughout by the heat directed thereon by said reflectors and reflected from said hood.

5. In an apparatus for preparing photoelectric plates, the combination of rotatable means for holding a plate, a motor, a mechanical transmission connecting said motor to said rotatable means for rotating the latter, means for varying the speed of rotation of said rotatable means, a switch adapted to be closed to start said motor, an adjustable member driven by said motor for opening said switch, and means for adjusting said member at will to vary the time interval between closing said switch and opening of said switch by said member.

6. In an apparatus for preparing photoengraving plates, the combination of a plate holder, a motor connected to said plate holder for rotating a plate having an initially fluid emulsion thereon to distribute the emulsion by centrifugal force uniformly over said plate, electric heating means for drying the emulsion on said plate, and timing means actuated by said motor and variable at will for controlling the duration of operation of said motor and simultaneously deenergizing said motor and heating means.

7. In an apparatus for preparing photoengraving plates, the combination of a rotatable member, centrifugally actuated jaws on said member for gripping a plate, an electric motor, a mechanical transmission connecting said motor to said member whereby upon operation of said motor the member is rotated at high speed to distribute an initially fluid emulsion uniformly over said plate, electrical heating means for drying said emulsion, and time control means actuated by said motor for deenergizing said motor and heating means, said time control means being adjustable to vary the time interval between energization and deenergization of said motor and heating means.

8. In an apparatus for preparing photoengraving plates, the combination of a rotatable holder for a plate, a mechanical transmission for rotating said holder, a motor for driving said transmission, heating means for said plate, a dome-shaped hood enclosing said rotatable holder and cooperating with said heating means to heat said plate uniformly, and means responsive to continuous operation of the said motor for controlling the duration of rotation of said plate and operation of said heating means.

9. In an apparatus for preparing photoengraving plates, the combination of rotatable means for holding a plate, a mechanical transmission connected to said means, a motor connected to said transmission for rotating the plate holding means to distribute fluid emulsion uniformly over said plate by centrifugal force, electric heating means for drying the emulsion on said plate, a switch controlling said heating means, and mechanism for actuating said switch to deenergize said heating means, said mechanism being actuated directly by said motor and adjustable at will to vary the duration of heating.

10. In an apparatus for preparing photoengraving plates, the combination of rotary means for holding the plate, a hemispherical hood enclosing said means and plate, a plurality of electric heaters mounted on said hemispherical hood, a reflector for one of said heaters for directing the heat thereof upon the inner part of said plate but avoiding the center thereof, and reflectors for the other heaters for directing the heat thereof on the marginal portions of said plate, whereby the plate is heated uniformly throughout by the heat directed thereon by said reflectors and reflected from said hood.

ARTHUR H. GAEBEL.